Patented Apr. 7, 1925.

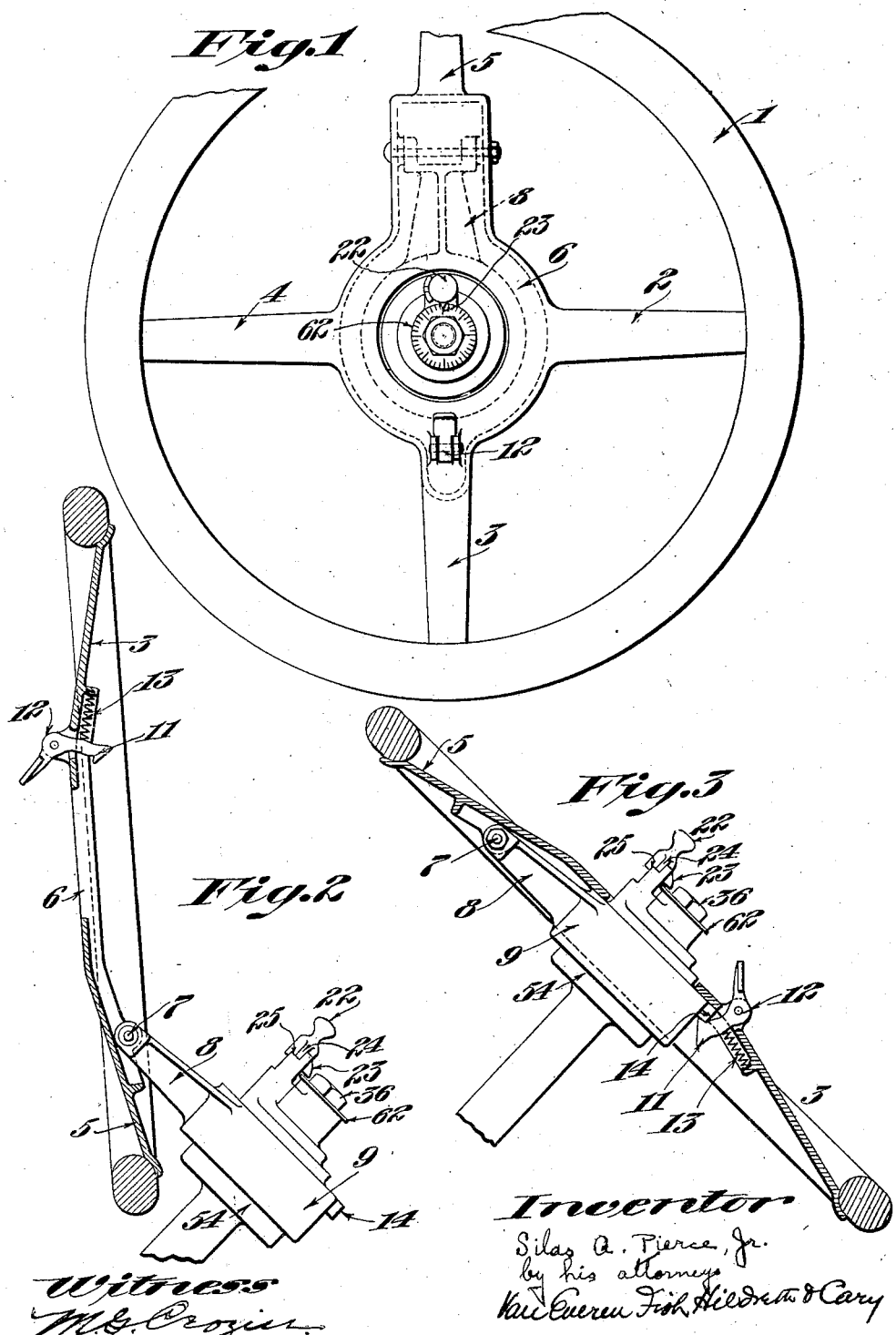

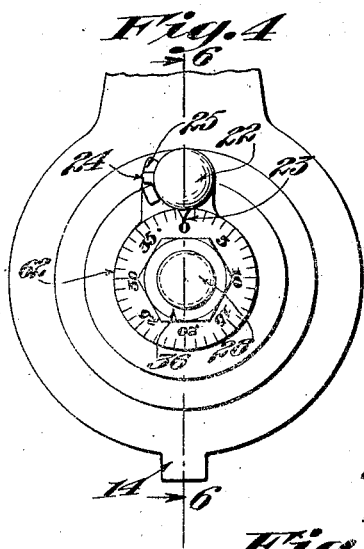
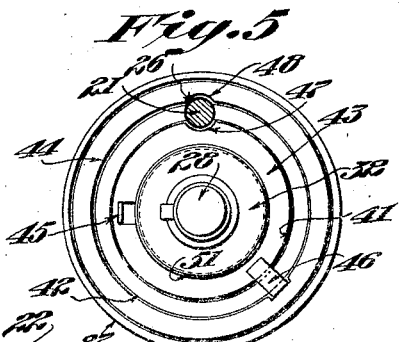
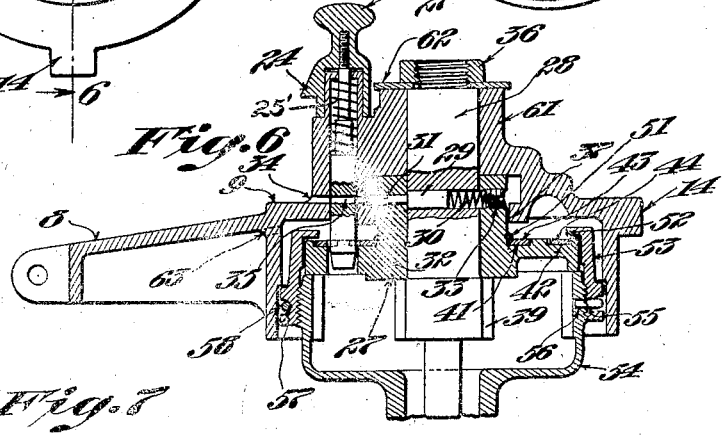
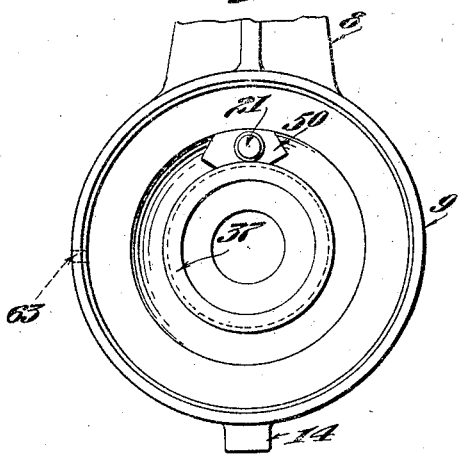
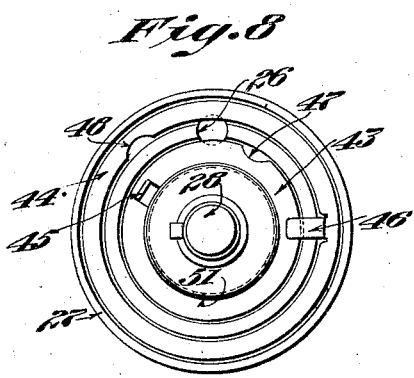

1,532,342

UNITED STATES PATENT OFFICE.

SILAS A. PIERCE, JR., OF PAWTUCKET, RHODE ISLAND, ASSIGNOR TO P. S. L. COMPANY, OF ATTLEBORO, MASSACHUSETTS, A CORPORATION OF MASSACHUSETTS.

STEERING WHEEL FOR AUTOMOBILES.

Application filed November 18, 1921. Serial No. 516,056.

*To all whom it may concern:*

Be it known that I, SILAS A. PIERCE, Jr., a citizen of the United States, residing at Pawtucket, in the county of Providence and State of Rhode Island, have invented certain new and useful Improvements in Steering Wheels for Automobiles; and I do hereby declare the following to be a full, clear, and exact description of the invention, such as will enable others skilled in the art to which it appertains to make and use the same.

The present invention relates to an improvement in steering wheels for automobiles.

The object of the invention is to produce an improved steering wheel having provision by virtue of which it may be tilted out of the way of the person entering or leaving the driver's seat, and in addition having provision for locking the steering wheel disconnected from the steering shaft, so that the machine may not be steered from the wheel. To the above ends the present invention consists in the steering wheel hereinafter described and particularly defined in the claims.

In the accompanying drawings illustrating the preferred form of the invention, Fig. 1 is a plan view of the wheel; Fig. 2 is a sectional elevation of the wheel, showing it in the tilted position; Fig. 3 is a sectional elevation of the wheel, showing it in steering position; Fig. 4 is an enlarged view of the combination dial and associated parts; Fig. 5 is a view of the tumblers and associated parts, with the steering wheel removed; Fig. 6 is a sectional elevation of the steering wheel housing and steering post head; Fig. 7 is a face view of the under side of the steering wheel housing; and Fig. 8 another view of the tumblers in position locking the steering wheel out of connection with the steering shaft.

The illustrated embodiment of the invention is described as follows: The rim 1 of the wheel is carried by the radial arms 2, 3, 4 and 5, which project from the nave 6. The arm 5 is pivotally supported on the bolt 7 of the arm 8, which projects from one side of the housing 9. The arm 3 is provided with a spring hook 11, pivoted at 12, and normally pressed radially inward by the spring 13, to engage the boss 14 projecting from the housing 9 on the opposite side from the arm 8. By pressing on the tail of the hook 11, it is disengaged from the boss 14, and the wheel may be lifted to the position illustrated in Fig. 2, so as thereby to move it out of the way of the person entering or leaving the driver's seat of the car. This housing 9 is detachably connected with the steering shaft, so that although the front wheels may be cramped or turned, the wheel, upon being disconnected from the steering shaft, may be turned to a position permitting it to be raised without movement of the front wheels of the car. This is a matter of convenience, as it often happens in parking a car alongside of a curb, that the front wheel will stand in cramped or turned position, and unless the wheels be brought back to a parallel position it is sometimes impossible to lift the steering wheel, or, if lifted, it may be lifted in the wrong direction to afford any added space for the ingress or egress of the driver.

The housing 9 is locked to the steering shaft by means of a bolt 21, which is mounted in a hole in the housing, and carries upon its upper end a handle 22, provided with an index point 23 and a shoulder hook 24. By lifting the handle 22, the bolt may be raised against the pressure of the spring 25', whereupon the bolt may be turned by the handle to swing the shoulder hook 24 over the supporting surface 25 of the housing. When so lifted, the bolt 21 is withdrawn from the hole 26 in the steering shaft disk 27, and the steering wheel is thereby disconnected from the steering shaft. Upon turning the bolt 21 so as to remove the shoulder hook from the supporting surface 25, the bolt is permitted to enter the hole 26 in the steering shaft disk 27, and thereby lock the two together. The steering shaft disk 27 is secured to the steering shaft stud 28 or steering shaft by means of a pin 29, which is pressed outwardly by a spring 30, which projects the locking end 31 of the pin 29 into a hole in the hub 32 of the steering shaft disk 27. The spring 30 is held in place by the screw 33 which is screwed into the end of the pin hole in the hub. The housing 9 is provided with a hole 34, which is opposite the locking pin 31. The bolt 21 is provided with a hole 35 which registers with the hole 34 when the bolt is in its locked position, as illustrated in Fig. 6. In order to remove the housing 9 from the steering shaft stud 28, the nut 36 on the end of the stud will first be removed. Then a small implement, such as a piece of wire, will be pushed in through the holes 34 and 35, and pressed against the end of the locking pin 31, which will thereby be pushed inward until it is pushed far enough to permit the flange 37 on the inside of the housing 9 to pass by the end of the locking pin. This, it will be observed, can only be done when the bolt 21 is in its lowered position locking the steering wheel and steering shaft together. The steering shaft stud carries the steering pinion 39, which engages the usual pinions by which the main steering shaft (not shown) is turned.

The steering shaft disk 27 has two grooves 41 and 42, which receive respectively the tumbler rings 43 and 44. The tumbler ring 43 is provided with an upwardly extending projection 45, and the tumbler ring 44 is provided with an overhanging projection 46, adapted to engage the projection 45. The two rings 43 and 44 are provided respectively with bolt notches 47 and 48. Either of the tumbler rings 43 and 44 will prevent the entrance of the bolt 21 into the hole 26 of the steering shaft disk 27. It is necessary, therefore, to bring the two bolt notches 47 and 48 into correct position in order to permit the locking bolt 44 to lock the wheel to the steering shaft disk. The steering wheel housing 9 is provided on its under side with a boss 50, through which the bolt 21 passes. The boss 50 is adapted to engage the overhanging projection 46 and move it either in one direction or the other, as the case may be. The tumbler ring 43 is held in normal position by the spring ring 51, which embraces the groove in the hub of the steering shaft disk 27. The tumbler ring 44 is held in its groove 42 by the flange 52 of the ring 53, which is screwed on to the usual steering head 54. After having been screwed down tight, a drill is inserted in the hole 55, and a hole 56 is drilled in the steering head 54. Then a circular spring 57, having its end radially extended inwardly, is sprung into the groove 58, and the radially inwardly extended end enters through the holes 55 and 56, and locks the ring 53 to the steering head 54. The housing 9 has a hub 61 which embraces the steering shaft stud 28. The combination dial or number ring 62 is clamped on the steering shaft stud 28 by the nut 36.

This steering wheel is particularly intended for use in connection with Ford cars, and it is applied to the car in the following manner. First the steering wheel is taken off, then the new parts are applied as follows: First the steering shaft disk 27, with the steering shaft stud 28 and the tumbler rings 43 and 44 in position, but with the locking pin 29 removed, is secured in place on the steering head 54 by screwing the ring 53 down into place, so that it holds the steering shaft disk 27 from tipping movement on the face of the steering head 54. Then the nut 36 and the number dial 62 are removed, and the steering wheel is put in place; that is to say, the hub 61 of the housing 9 is slipped over the end of the steering shaft stud 28. The wheel is then turned to the right, thereby causing the boss 50 on the housing 9 to engage the projection 46 on the tumbler ring 44 which in turn engages the projection 45 on the tumbler ring 43, and turns the latter to a position which is believed to be such as to bring the bolt notch 47 opposite the holes 26. By turning the steering wheel to a position which it is estimated will accomblish this, removing it and observing the position of the bolt notch 48, and repeating the operation, the tumbler ring 43 may finally be brought to a correct position. The combination dial will then be placed on the steering shaft stud 28 and temporarily brought to position with a mark on it registering with a mark on the end of the steering shaft stud 28. The number which the index 23 indicates on the combination dial will then be noted. This is the first number of the combination. The wheel will then be turned in the opposite direction for the purpose of bringing the bolt notch 48 opposite the bolt hole 26, and after a few trials, it will be brought to that correct position, and the second number indicated by the index 23 on the combination dial 62 will be noted. This is the second number of the combination. Then the wheel will be turned to bring the bolt 21 opposite the bolt hole, and after a few trials this will be accomplished, and thus the third number of the combination will be ascertained, and as a consequence, the complete combination will have been determined. The bolt will now be turned and permitted to drop into the hole in the steering shaft disk 27. The correctness of the combination should now be tested without removing the wheel so as definitely to fix it before proceeding further. Now the wheel will be lifted off of the steering shaft stud 28, and the locking pin 29 inserted in position. Thereupon the wheel and associated parts, the bolt 21 being lifted, will be slipped down on the steering shaft stud 28 until the locking pin 31 comes in contact with the inwardly extended flange 37. A wire, or other slender instrument, inserted through the hole 63 in the side wall of the housing 9, will be employed to push the locking pin 31 back, so as to permit it to pass the flange 37, after which it will snap in place and hold the housing 9 securely on the steering shaft stud 28.

The hole 63 in the skirt of the housing 9 is shown in Fig. 7. In Fig. 6 it is also shown, but rotated through substantially 90 degrees. This indicates the position of the hole with relation to the flange 37. The combination dial 62 will then be put in place with the mark on it registering with the mark on the stud 28, and then the nut 36 will be screwed down, locking it in place against the shoulder on the steering shaft stud. The skirt of the housing 9 prevents access to the spring locking ring 57, so that the ring 53 may not be removed from the steering head. The locking pin 31 can only be pushed back to permit the lifting of the steering wheel off of the steering shaft stud 28 when the bolt is lowered, and since it can only be lowered when the combination has been correctly positioned, it follows that in order to disassemble the device, the combination must be known.

In use, when the driver stops and desires to prevent his car from being stolen, he pulls up the bolt 21 and gives the steering wheel a spin, which moves the locking rings so as to offset the bolt notches from the bolt hole. Then he turns the wheel until the hinge 7 is in forward position. Thereupon he presses upon the tail of the snap hook 11, releases the wheel, and throws it up into the position shown in Fig. 2. The driver may leave the seat with ease, and without necessity for squeezing out from under the steering wheel, and during his absence the car stands either with the wheel raised, as shown in Fig. 2, or it may be swung back again, as shown in Fig. 3. But the steering wheel is free, and any attempt to lock it to the steering shaft will be unavailing until the combination has been operated to bring the bolt notches in the tumbler rings and the bolt into position at the bolt hole, and thereupon the bolt may be shot to reconnect the steering wheel with the steering shaft. The operation of the lock as such is facilitated by the size of the steering wheel. With the index located near the center, and considering the size of the steering wheel, it is easy to turn the wheel to bring the index opposite the successive numbers on the combination dial. Thus, for example, the operation of the combination lock would be as follows: Assuming the successive numbers were 27, 23, and 1: turn the steering wheel three or more times to the right, stopping at 27, turn left passing 27 and stopping at 23, then turn right to 1.

Having thus described the invention, what is claimed is:

1. A steering wheel for automobiles having, in combination, a steering shaft, a disk mounted on the steering shaft and rotatable therewith, a housing provided with an inwardly extending flange, a spring pressed pin bodily rotatable with the disk adapted to engage the flange on the housing to prevent the disassembling of the housing from the disk, a locking bolt for locking the housing to the disk, said locking bolt and housing being provided with holes adapted to be aligned when the locking bolt is in operative position, thereby enabling a slender instrument to be inserted in the holes for the purpose of pushing back the pin against the pressure of its spring, and thereby permit the disengagement of the housing from the steering shaft disk, and a steering wheel mounted on the housing.

2. A steering wheel for automobiles having, in combination, a steering head, a steering shaft, a disk mounted on the steering shaft, a holding ring for holding the steering shaft on the housing, a circular spring having an inwardly-extended end engaging aligned holes in the ring and steering head for holding them in locked position with respect to each other, a housing, a steering wheel mounted on the housing said housing being provided with a skirt covering the circular spring, preventing access thereto.

3. A steering wheel for automobiles having, in combination, a steering shaft, a disk on the steering shaft provided with a bolt hole, a housing, a steering wheel mounted on the housing, said housing being provided with an inwardly extended flange, a spring pin connected with the disk for engaging the flange and holding the housing locked upon the steering shaft disk, said housing being provided with a hole located in such position that when assembling the housing on the steering shaft disk, a slender instrument may be inserted through the hole for the purpose of pushing the spring pin back so as to permit it to pass the flange, and thereby permit the housing to be moved to correct position with relation to the steering shaft disk.

4. A steering wheel for automobiles having, in combination, a steering shaft, a disk mounted on the steering shaft provided with two tumbler rings, the disk being provided with a bolt hole, and each tumbler ring being provided with a bolt notch, a housing, a steering wheel carried by the housing, a bolt carried by the housing adapted to enter the hole in the steering shaft disk when the two notches in the tumbler rings are opposite the bolt hole, said housing being provided with a boss and the tumbler rings being provided with projections so arranged with respect to each other that the boss engages a projection on one tumbler ring, and the latter engages a projection on the other tumbler ring, so that the second tumbler ring is operated from the housing through the intervention of the first tumbler ring.

5. A steering wheel for automobiles having, in combination, a steering shaft, a steering shaft disk provided with a bolt hole, a housing, a steering wheel carried by the housing, a bolt mounted on the housing and adapted to enter the hole in the steering shaft disk, said bolt being provided with a shoulder hook, a shoulder supporting surface on the housing adapted to be engaged by the shoulder hook and to support the bolt out of position from engagement with the hole in the steering shaft disk, said bolt being provided with an index, a combination dial secured to the steering shaft, the index being adapted to be turned by the steering wheel to bring it opposite successive numbers on the dial, a combination lock carried between the housing and the steering shaft disk and adapted to be operated by the steering wheel to permit the bolt to enter the hole in the steering shaft disk and thereby lock the steering wheel to the steering shaft.

SILAS A. PIERCE, Jr.